No. 788,820. PATENTED MAY 2, 1905.
R. J. CHRISTY.
SAFETY RAZOR.
APPLICATION FILED OCT. 20, 1904.
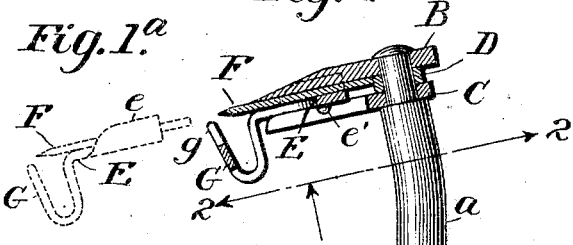
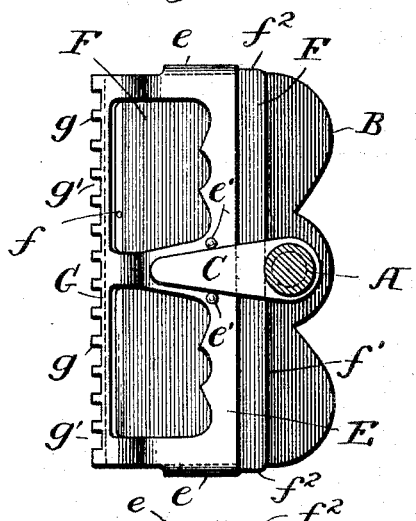
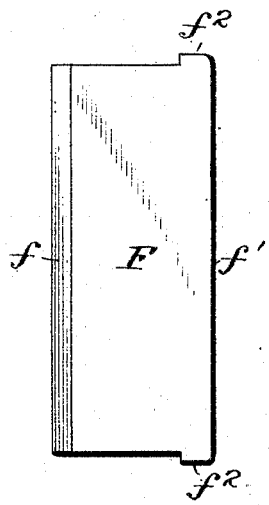
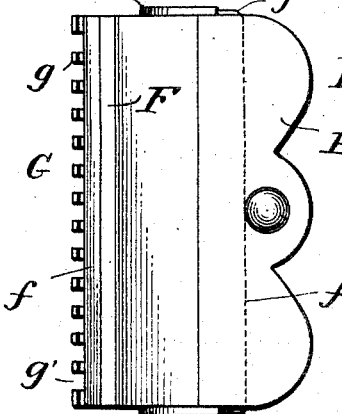
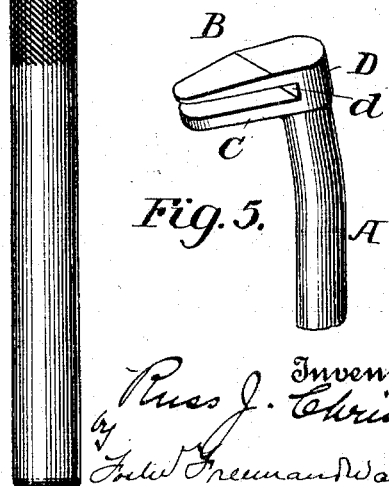

No. 788,820. Patented May 2, 1905.

UNITED STATES PATENT OFFICE.

RUSS J. CHRISTY, OF FREMONT, OHIO.

SAFETY-RAZOR.

SPECIFICATION forming part of Letters Patent No. 788,820, dated May 2, 1905.

Application filed October 20, 1904. Serial No. 229,308.

*To all whom it may concern:*

Be it known that I, RUSS J. CHRISTY, a citizen of the United States, residing at Fremont, in the county of Sandusky, State of Ohio, have invented certain new and useful Improvements in Safety-Razors, of which the following is a specification.

My invention relates to safety-razors; and it has for its object to provide an improved and simplified construction that can be cheaply made and is adapted to produce improved results in practical use; and to these ends my invention consists in the various features of construction and arrangement of parts, having the general mode of operation substantially as hereinafter more particularly pointed out.

Referring to the accompanying drawings, wherein I have illustrated the preferred embodiment of my invention, Figure 1 is a side view, partly in section, of the safety-razor. Fig. 1$^a$ shows in dotted lines the carrying-frame and blade in position to be inserted between the jaws. Fig. 2 is a plan view showing the handle in section on the line 2 2 of Fig. 1. Fig. 3 is a plan view of the blade. Fig. 4 is a top plan view of Fig. 1, and Fig. 5 is a detail showing a modified form of the jaws.

In the embodiment of my invention disclosed in the drawings, A represents a handle, which may be of any suitable form and construction, it being shown as a rigid bar, preferably bent slightly near one end, as at $a$, and adapted to support the blade at practically right angles to the handle. This handle is provided with means for holding the blade and its carrying-frame, and these means are shown in the form of rigid jaws B and C, which may be secured in any suitable way to the handle or may form an integral part thereof, they being shown in Fig. 1 as made in two separate parts mounted on the handle and separated by a washer D, while in Fig. 5 the jaws and washer are shown as integral and preferably also integral with the handle A. In this latter construction the central portion corresponding to the washer D is preferably provided, as shown, with a flat surface $d$ to form an abutment for the blade when in position between the jaws. One of the jaws, as B, may be expanded laterally to assume the general contour of a hoe, as indicated in Figs. 2 and 4, or it may be relatively narrow, as shown in Fig. 5. So, too, the exact shape or contour of the jaw C may vary; but preferably it is of a contour best indicated in Fig. 2. Whatever may be their contour or shape, they comprise two rigid jaws having parallel opposing faces forming a lateral opening adapted to receive and retain the carrying-frame and blade.

The carrying-frame E may be of various shapes or contours and is provided with end guides $e$, and it is adapted to hold the blade F. Preferably the front portion of the carrying-frame is formed so as to constitute a comb G, it being shown as being bent upon itself and having spaces $g'$ and teeth $g$, the latter extending into substantially the plane of the bearing-face of the carrying-frame and adapted to extend adjacent to the edge of the blade F, preferably a little in front of the same, for the purpose not only of forming a safety-guard, but also of forming a receptacle for holding the lather and beard.

The cutting-blade F comprises a flat rigid plate of practically uniform thickness, having a front cutting edge $f$ and a rear bearing-edge $f'$ and also having ears or projections $f^2$ at its ends near its rear edge. This blade is placed upon the carrying-frame with its ends between the end guides $e$, which serve to locate the blade properly on the carrying-frame with relation to its endwise position, and the ears $f^2$ of the blade bear upon the end guides $e$ and serve to locate the blade on the carrying-frame with relation to its edgewise position and when the comb or safety-guard is used with relation to this also.

In assembling the parts of the safety-razor for purposes of use the cutting-blade F is placed upon the carrying-frame so that its ends are between the end guides $e$ and its ears $f^2$ rest against said end guides, substantially as indicated in Fig. 1$^a$, and then the carrying-frame and cutting-blade are forced between the rigid jaws B and C, as indicated in Fig. 1, and preferably until the rear bearing edge of the blade impinges upon the washer D, which forms an abutment therefor determining the relation of the blade and frame to the jaws. In this position the razor is in condition for use, and the carrying-frame and blade are removable from the jaws by moving them sidewise with the cutting edge in front. When the jaw B is extended, as indicated in Fig. 2, the end guides e of the carrying-frame may be extended beyond the thickness of the blade F, so that they may bear upon the edges of the expanded portions of the jaw B to further insure proper relations between the carrying-frame and blade and the jaws. When, however, the jaws are in the form similar to that shown in Fig. 5, the carrying-frame is preferably provided with stops e' in the form of lugs or pins adapted to bear against the edges of the jaw C when the parts are in position and serve to maintain them in their proper relations. In this way it will be seen that the carrying-frame and blade can be quickly and readily inserted between and removed from the jaws and brought into proper relations thereto through the medium of the end guides or the stops on the frame, and the washer D also aids in determining and maintaining the parts in proper relations. It will be observed that in removing the carrying-frame and blade from the jaws, as above indicated, they are withdrawn sidewise with the front edge away from the handle and jaws, so that there is no danger of the edge of the blade coming in contact with the jaws or being injured thereby.

Such being the general construction and arrangement of the various parts of my improved razor, it will be seen that they are all exceedingly simple and inexpensive to manufacture and at the same time are effective in operation and that the parts can be quickly adjusted in proper relations for use and the blade and frame removed for the purpose of sharpening the blade or replacing it with another one, as well as for cleaning the parts. Further, it will be seen that the use of adjustable clamping devices of all sorts is avoided, which are not only relatively expensive to make, but are liable to get out of order. Again, the blade being of flat rigid material of substantially uniform thickness is cheaply made, easily kept in proper condition for use, and is held in the carrying-frame between the rigid jaws when in use and can readily and quickly be removed therefrom.

Having thus specifically described the preferred embodiment of the invention, without limiting myself to the specific details, what I claim is—

1. In a safety-razor, a cutting-blade comprising a flat rigid plate of uniform thickness, the front edge being a cutting edge and the rear edge having ears projecting beyond the ends of the blade, substantially as described.

2. In a safety-razor, the combination with a handle having rigid jaws, of a carrying-frame having end guides and adapted to hold the cutting-blade, and having a comb the teeth of which extend substantially into the plane of the bearing-surface of the frame, substantially as described.

3. In a safety-razor, the combination with a carrying-frame having end guides, of a cutting-blade having ears adapted to bear against the end guides, substantially as described.

4. In a safety-razor, the combination with a carrying-frame having end guides and having a comb the teeth of which project substantially into the plane of the bearing-surface of the frame, of a flat rigid cutting-blade having ears adapted to bear against the end guides and maintain the blade in proper relation to the carrying-frame, substantially as described.

5. In a safety-razor, a handle provided with rigid jaws having parallel opposing faces forming a lateral opening to laterally receive a flat cutting-blade, substantially as described.

6. In a safety-razor, a handle provided with rigid jaws having parallel opposing faces separated by a washer and forming a lateral opening to receive the cutting-blade, substantially as described.

7. In a safety-razor, a handle provided with rigid jaws having parallel opposing faces, one of the jaws being expanded laterally to form an extended bearing-surface, substantially as described.

8. In a safety-razor, the combination with a handle provided with rigid jaws having parallel opposing faces and opening laterally, of a cutting-blade comprising a flat rigid plate having a cutting edge and removable from said jaws sidewise with its cutting edge in front, substantially as described.

9. In a safety-razor, the combination with a handle provided with rigid jaws having parallel opposing faces and opening laterally, of a carrying-frame, and a cutting-blade carried thereby, the said carrying-frame and blade being removable from the jaws sidewise with the cutting edge in front, substantially as described.

10. In a safety-razor, the combination with the rigid jaws having parallel opposing faces, of a removable carrying-frame, a flat cutting-blade carried thereby, and devices for guiding and maintaining the carrying-frame with relation to the jaws, substantially as described.

11. In a safety-razor, the combination with the rigid jaws, of a carrying-frame having end guides, and a cutting-blade carried by said frame, the end guides being extended to form guides for one of the jaws, substantially as described.

12. In a safety-razor, the combination with the rigid jaws, of a carrying-frame having end guides, a blade having ears engaging said end guides, and devices for guiding and maintaining the carrying-frame and blade with relation to the jaws, substantially as described.

13. In a safety-razor, the combination with the rigid jaws having parallel opposing faces and an abutment between the faces, of a carrying-frame having end guides, and a blade having ears, the end guides being extended to form a guide for one of the jaws, whereby the blade is held upon the carrying-frame between the end guides and its rear edge bears against the abutment, and the carrying-frame and blade being removable sidewise from the jaws, substantially as described.

14. In a safety-razor, the combination with the rigid jaws having parallel opposing faces and opening laterally, of a carrying-frame having end guides and provided with a guard having teeth extending substantially in the plane of the frame, and devices for guiding the frame with relation to the jaws, the carrying-frame being removable sidewise from the jaws, substantially as described.

15. In a safety-razor, the combination with the rigid jaws opening laterally, of a carrying-frame provided with a guard having teeth extending substantially in the plane of the frame, and devices for guiding the frame with relation to the jaws, and a flat rigid blade having ears, the carrying-frame and blade being removable sidewise from the jaws, substantially as described.

In testimony whereof I have signed my name to this specification in the presence of two subscribing witnesses.

RUSS J. CHRISTY.

Witnesses:
F. H. CRESS,
C. C. TUNNINGTON.